US006683555B2

(12) United States Patent
Carlson et al.

(10) Patent No.: US 6,683,555 B2
(45) Date of Patent: Jan. 27, 2004

(54) FAST DEPLOY, RETRIEVABLE AND REUSABLE AIRBORNE COUNTER-MEASURE SYSTEM

(75) Inventors: Mark A. Carlson, Amherst, NH (US); James J. Jordan, Nashua, NH (US); John Russotti, Hudson, NH (US)

(73) Assignee: BAE Systems Information and Electronic Systems Integration, Inc., Nashua, NH (US)

( * ) Notice: Subject to any disclaimer, the term of this patent is extended or adjusted under 35 U.S.C. 154(b) by 34 days.

(21) Appl. No.: 10/105,716

(22) Filed: Mar. 25, 2002

(65) Prior Publication Data

US 2003/0122699 A1 Jul. 3, 2003

Related U.S. Application Data

(60) Provisional application No. 60/328,594, filed on Oct. 10, 2001, provisional application No. 60/328,603, filed on Oct. 10, 2001, and provisional application No. 60/328,617, filed on Oct. 10, 2001.

(51) Int. Cl.$^7$ ............................................. H01Q 15/14
(52) U.S. Cl. ................. 342/14; 342/5; 342/7; 342/9
(58) Field of Search ................. 342/5, 6, 7, 8, 342/9, 10, 11, 12, 13, 14, 15, 16, 17, 18, 19, 20

(56) References Cited

U.S. PATENT DOCUMENTS

| | | | |
|---|---|---|---|
| 2,731,046 A | * | 1/1956 | Bachner .................. 342/9 |
| 3,339,201 A | * | 8/1967 | Fischer et al. ............. 342/14 |
| 3,987,746 A | | 10/1976 | McCulloh |
| 4,808,999 A | | 2/1989 | Toman |
| 4,978,086 A | | 12/1990 | Spicer |
| 5,014,997 A | | 5/1991 | Smith et al. |
| 5,020,742 A | | 6/1991 | Haslim |
| 5,029,773 A | | 7/1991 | Lecat |
| 5,094,405 A | | 3/1992 | Brum |
| 5,102,063 A | | 4/1992 | Brum |
| 5,136,295 A | | 8/1992 | Bull et al. |
| 5,260,820 A | * | 11/1993 | Bull et al. .................. 342/9 |
| 5,333,814 A | | 8/1994 | Wallis |
| 5,398,032 A | * | 3/1995 | Tucker et al. ............... 342/9 |
| 5,497,156 A | * | 3/1996 | Bushman ................... 342/9 |
| 5,501,411 A | | 3/1996 | Brum et al. |
| 5,570,854 A | | 11/1996 | Brum et al. |
| 5,603,470 A | | 2/1997 | Fitzgerald et al. |
| 5,605,306 A | | 2/1997 | Fitzgerald et al. |
| 5,836,535 A | | 11/1998 | Brum |

* cited by examiner

Primary Examiner—Bernarr E. Gregory
(74) Attorney, Agent, or Firm—Daniel J. Long; Robert K. Tendler

(57) ABSTRACT

A fast deployment and retrieval system permits the rapid deployment of a decoy in seconds in response to an incoming threat, thus eliminating the necessity of pre-deployment, with retrieval permitting reeling in and deployment of the decoy a number of times during a mission in response to threats, and a commensurate reduction in life cycle cost. Upon detection of an incoming threat by a warning receiver, a controller coupled to a transmission releases a brake that is utilized to control the speed of deployment, whereas upon retrieval, the transmission drives a motor for retrieval of the decoy. The system is thus reusable, fast reacting, and also minimizes range penalty considerations because the decoy is only deployed when needed. In one embodiment, the system accommodates both a towing cable and a fiber-optic signal cable in which apparatus for unwinding of the cables is mechanically ganged together so that the cables pay out at the same rate. This type of payout lowers the stress on the fragile fiber-optic cable making possible multiple deployments and retrievals in response to separate threats during a mission. In another embodiment, a single, structural member with embedded conductors is utilized to connect the towed device to the round assembly.

18 Claims, 8 Drawing Sheets

FAST DEPLOY, RETRIEVABLE AND REUSABLE AIRBORNE COUNTER-MEASURE SYSTEM

CROSS REFERENCE TO RELATED APPLICATIONS

This application claims rights under 35 U.S.C. 119(e) under U.S. Provisional Applications Ser. Nos. 60/328,594; 60/328,603; and 60/328,617, all filed on Oct. 10, 2001.

FIELD OF INVENTION

This invention relates to deployable countermeasures, and more particularly, to a system for the deployment and retrieval of a towed decoy.

BACKGROUND OF THE INVENTION

As will be appreciated, aerial towed objects are used for a variety of purposes, including decoys, testing, and scientific investigations. In one embodiment, the decoys are used to draw various types of guided weapons away from an aircraft that the weapons are intended to destroy. These towed targets and decoys typically contain various types of electronic circuits to create an apparent target to a weapon in order to attract the weapon to the decoy rather than the aircraft. One such active electronic device is a traveling wave tube amplifier equipped transponder to which high voltages must be applied to power its traveling wave tube. Additionally, other controls for the traveling wave tube or other electronics in the towed object are transmitted in one embodiment along a fiber-optic transmission line, which is both fragile and frangible.

In the past, it has been the practice to pre-deploy the decoys such that when an aircraft arrives at a hostile area, the decoys will already be in place and capable of performing their intended countermeasure function. Typically, these decoys are deployed in a relatively slow manner, often taking several minutes for the decoy to arrive at a predetermined distance behind the aircraft.

When missions can last, for instance, for as much as six hours, there are aircraft range considerations involved in predeployment, as well as potential restrictions placed on aircraft with a decoy in tow.

Thus, in combat situations, when an aircraft is entering into hostile territory, one or more decoys are towed behind the aircraft until such time as the aircraft leaves the hostile territory. Thereafter, the decoy is cut loose from the aircraft and sacrificed.

There are obviously two problems associated with such a system. First, flying around with a decoy could limit the range of the aircraft as well as possibly requiring limits on the types of tactical maneuvers that the aircraft can perform. Secondly, sacrificing the towed decoy at the end of the mission is both expensive and results in inordinate delays in reprocurement.

In general, it would be desirable to only deploy the decoy round when a threat has been sensed and to be able to retrieve the decoy round for redeployment during the same combat mission as additional threats are detected.

By way of further background, the typical manner of deployment is such that when a decoy has fulfilled its function, it is simply cut loose. For this purpose, the fiber optic wires and the high tension line are severed, with the severing taking place after the high voltage has been removed and after all usable signals along the fiber optic cable have been terminated.

The practice of cutting loose decoys after use and using them as an expendable commodity causes the above-noted problems. As a result it becomes important to be able to recover the towed decoy itself, mainly because of the cost of the towed vehicle, as well as the fact that replacing towed vehicles often is difficult due to the long lead times for the manufacture and provision of such decoys.

For instance, typically a towed counter-measure decoy may cost as much as $50,000 per decoy round. As many as eight decoys per sortie or mission can be deployed and as such, assuming 400 sorties per month, then the total expense of deploying expendable decoys is quite large, making the cost for the protection of the aircraft that employs these decoys excessive. Moreover, in a wartime setting, the decoy cannot be manufactured quickly enough. So bad is the situation that it may be necessary to scrounge used decoys from the battlefield where they fall.

It will be appreciated that prior to the subject invention, the only type of retrievable devices from aircraft were the sonobuoys that were dropped from helicopters on a line and then winched back up into the helicopter itself. Another type of towed device was an air speed head that was used to measure a variety of parameters behind an airplane. These types of devices were winched back into a pod on the aircraft in a conventional manner. In the above examples of winched-in sonobuoys or towed instruments, the instruments were never used in any kind of airborne counter-measure environment. Thus they were not carried in such a manner that they could be rapidly deployed in a battlefield scenario. Certain types of countermeasures were tested using 5–6 foot long test pods. However, the apparatus proved too large and cumbersome for tactical employment.

Note that the above airborne-winch systems are incompatible with deployment of towed decoys and current volume constraints on tactical aircraft, both due to size and due to problems with slowly winching out a drogue or towed vehicle of any kind. Further, sonobuoys and pod-mounted countermeasures typically were carried in an equipment pod the size of the MK-84 aerial bomb or the ALQ164-type electronics counter-measures pod. What will be appreciated is that these pods are exceptionally large and preclude, for instance, the carrying of armaments in the position where a pod is located. Thus, the payload of any attack aircraft would be severely limited if one were to use such unwieldy winching systems along with housings that are many times the size of a normal decoy round.

There is therefore a need for a compact launching and retrieval system for decoy rounds with an improved and miniaturized winching mechanism that would permit both rapid deployment of the decoy while at the same time being able to reel in the decoy and permitting it to dock so that it can be redeployed.

By way of further background, the types of decoys involved have included devices which counter-measure infrared guided and radar guided missiles that pose the primary threats to military aircraft engaged in a combat environment. Note that these missiles use their radar guidance systems to get within striking distance of the aircraft, thereby substantially increasing the probability that the IR system on the missile will be able to lock onto the target.

Current military aircraft are particularly vulnerable to attack from IR-guided surface-to-air and air-to-air missiles. Statistical data of aircraft losses in hostile actions since 1980 show that the majority of these losses have been the result of IR-guided missile attacks. As a result, the ability to deploy, recover and redeploy decoys that can countermeasure the IR guidance systems on these missiles is of great value to protect aircraft during combat situations. As mentioned above, the IR-guided system initially utilizes radar guidance and then switches over to IR guidance as they come into closer proximity to the target. If one can countermeasure the radar system, then the IR portion can never lock onto the particular infrared target. To do this, the missile is deflected away by generating a signal that causes the radar guidance system in the missile to think that the target is actually elsewhere than it actually is.

In the past the ALE-50 Towed Decoy system currently in the inventory of the US Armed Forces includes a decoy round in a canister and a reel payout mechanism. When the decoy has served its purpose, it is cut loose and the ALE-50 decoy is lost.

Moreover, the same scenario is true for the more modern ALE-55, or in fact, any type of expendable towed vehicle.

As will be appreciated, there are a number of US patents that in general cover towed vehicle deployment, such as U.S. Pat. Nos. 5,836,535; 5,603,470; 5,605,306; 5,570,854; 5,501,411; 5,333,814; 5,094,405; 5,102,063; 5,136,295; 4,808,999; 4,978,086; 5,029,773, 5,020,742; 3,987,746 and 5,014,997, all incorporated by reference herein.

In summary, prior art decoys were predeployed and towed for the entire duration of the mission after which they were cut free after exiting hostile territory.

SUMMARY OF THE INVENTION

In order to change the entire tactical strategy in which decoys are deployed, in the subject system, decoys are deployed at the time when a threat is sensed, with the rapid deployment method described herein permitting the decoy to be deployed in seconds, rather than in minutes. This is sufficient time for the decoy to be effective in thwarting an attack. After the threat has ceased, the decoy is retrieved by reeling it in so that it can be deployed again.

The system contemplates single and multiple cable use, with the deployment system to be described permitting the use of fragile fiber-optic cables and eliminates the necessity of using fiber-optic rotary couplers. In a multi-cable embodiment, the fiber-optic cable is wound around a tow cable when the decoy is deployed, with deployment and retrieval, done in such a manner that damage to the fiber-optic cable is kept to a minimum.

For the more complicated multi-cable embodiment, deployment or payout of the dual cable system is accomplished through providing both a tow cable and a fiber-optic cable wound around respectively a rotating spindle with a rotationally fixed bail and a rotationally-fixed bobbin with a rotating pickoff. The takeoff apparatus which removes the cables from the respective spindle and bobbin is mechanically linked or ganged together such that the payout of the towing cable matches the payout of the fiber-optic cable to prevent cable damage.

When a warning receiver indicates an imminent threat, the output of the warning receiver is applied to a control unit which is in turn coupled to a transmission to drive a solenoid braking bobbin is mechanically linked or ganged together such that the payout of the towing cable matches the payout of the fiber-optic cable to prevent cable damage.

When a warning receiver indicates an imminent threat, the output of the warning receiver is applied to a control unit which is in turn coupled to a transmission to drive a solenoid braking system for controlling the speed of rotation of the spindle and the pick which rotates with the spindle so as to pick off or unwind the fiber-optic cable carried on the non-rotating bobbin as the bobbin translates back and forth. The unwound towline goes through the center of the spindle where the unwound fiber-optic cable meets it and is wound around the tow cable during deployment in a helical fashion.

The speed at which the tow cable is deployed is controlled by the brake on the spindle, whereas a double helix pick translation mechanism driven by the rotating spindle causes the unwinding of the fiber-optic cable from the bobbin in lock step with the deployment of the towing cable.

The speed of deployment, in terms of how much cable per second exits the canister housing the system is controlled by the braking system for the rotating spindle which houses the tensile member.

Since the pick for the bobbin housing the fiber-optic cable controls the speed of deployment of the fiber-optic cable and moves with the rotation of the spindle, there is a mechanical linkage that results in synchronization of the speeds of deployment of the fiber-optic cable and the speed of deployment of the towed cable to a good approximation, thus controlling stress imparted on the fiber.

In the case of the bail which is utilized to remove the towing cable from the spindle, the bail translates back and forth so that the cable which is helically wound on the spindle is removed in a In short, for the dual cable embodiment, there are two level-winding and unwinding devices associated respectively with the spindle and the bobbin which control the synchronization between the deployment and retrieval of the tow cable and the deployment and retrieval of the fiber-optic cable.

Because the fiber-optic cable is carried on a non-rotating bobbin, there is no necessity for a fiber-optic rotary joint, or other type of dynamic optical interface, to be able to connect control signal generating apparatus to the fiber-optic cable. The new re-usable countermeasure system thus provides significant benefits in terms of cost and logistics, while minimizing aircraft installation and performance penalty.

In summary, a fast deployment and retrieval system permits the rapid deployment of a decoy in seconds in response to an incoming threat, thus eliminating, the necessity of pre-deployment, with retrieval permitting reeling in and deployment of the decoy round a number of times during a mission in response to threats. Upon detection of an incoming threat by a warning receiver, a controller coupled to a transmission releases a brake that is utilized to control the speed of deployment, whereas upon retrieval, the transmission drives a motor for retrieval of the decoy. The system is thus reusable, fast reacting and also minimizes range considerations because the decoy is only deployed when needed. In one embodiment, the system accommodates both a towing cable and a fiber-optic signal cable in which apparatus for unwinding of the cables is mechanically ganged together so that the cables pay out at the same rate. This type of payout lowers the stress on the fragile fiber-optic cable making possible multiple deployments and retrievals in response to separate threats during a mission.

For the multi-cable embodiment, deployments in seconds versus minutes is accomplished through the utilization of a spindle that carries the tow line and a translating bobbin that carries the fiber-optic cable, with the fiber-optic cable being wound around the tow cable as the dual cables fiber-optic cable, with the fiber-optic cable being wound around the tow cable as the dual cables are deployed. In one embodiment, a bobbin-pick combination stores, deploys and retrieves the fiber-optic cable, whereas a spindle-bail combination stores, deploys and retrieves the tow cable. The relative speeds between the bobbin-pick combination and the spindle-bail combination are adjusted through a mechanical linkage that gangs together the two mechanisms so that the two cables, are deployed at matched payout speeds.

BRIEF DESCRIPTION OF THE DRAWINGS

These and other features of the subject invention will be better understood in connection with the Detailed Description in conjunction with the Drawings, of which.

DETAILED DESCRIPTION

Figure 1:
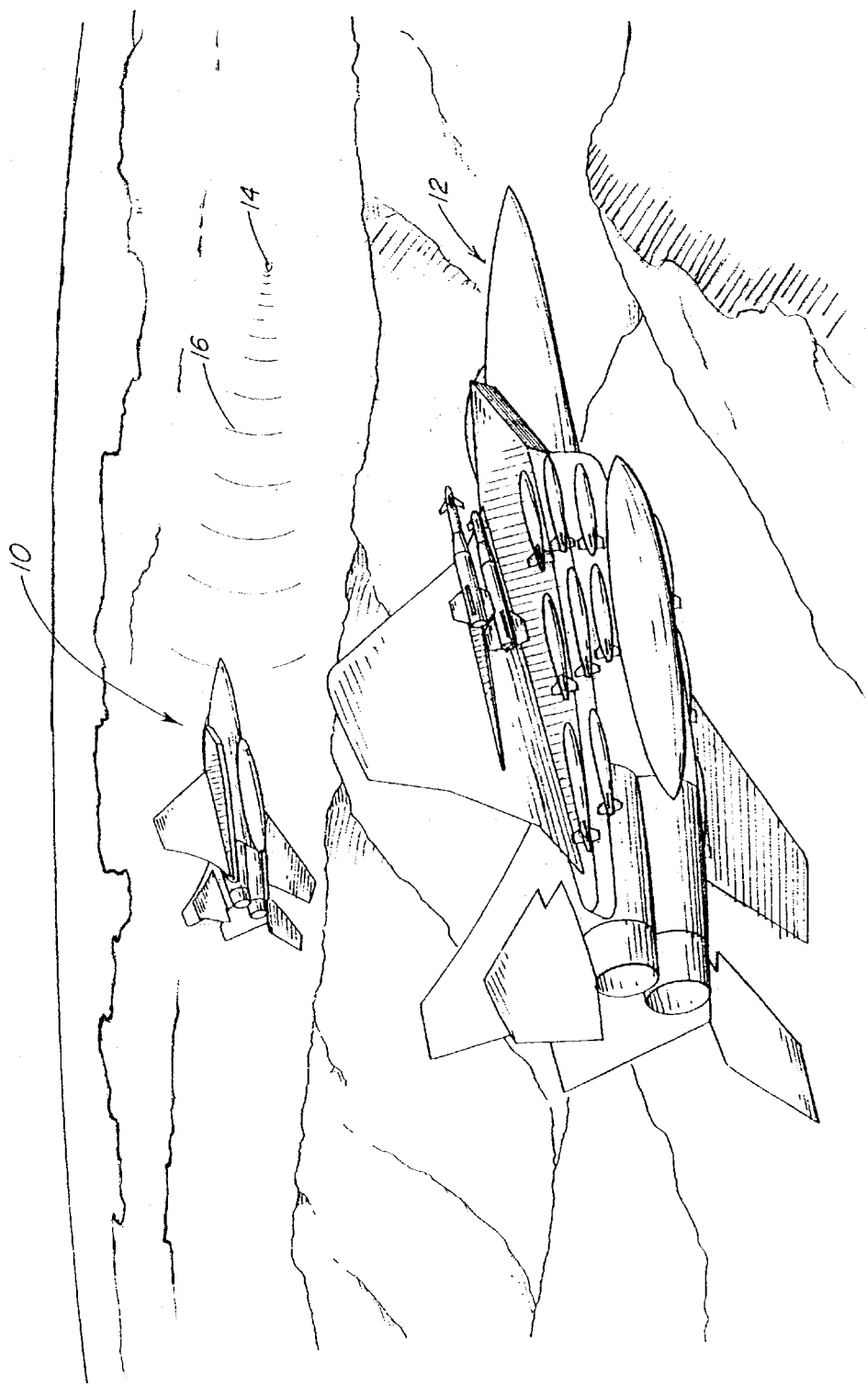
FIG. 1 is a diagrammatic illustration of a tactical situation in which a fighter carrying a full complement of armaments is illuminated by a ground radar for the purpose of launching and intercepting an interceptor missile.

Referring now to FIG. 1, during a typical mission, fighter jets 10 and 12 overfly a given area. If during the overflight a radar 14 illuminates aircraft 10 as illustrated at 16 then it is assumed that the illumination is for the purpose of launching an interceptor missile to destroy the aircraft.

Figure 2A:
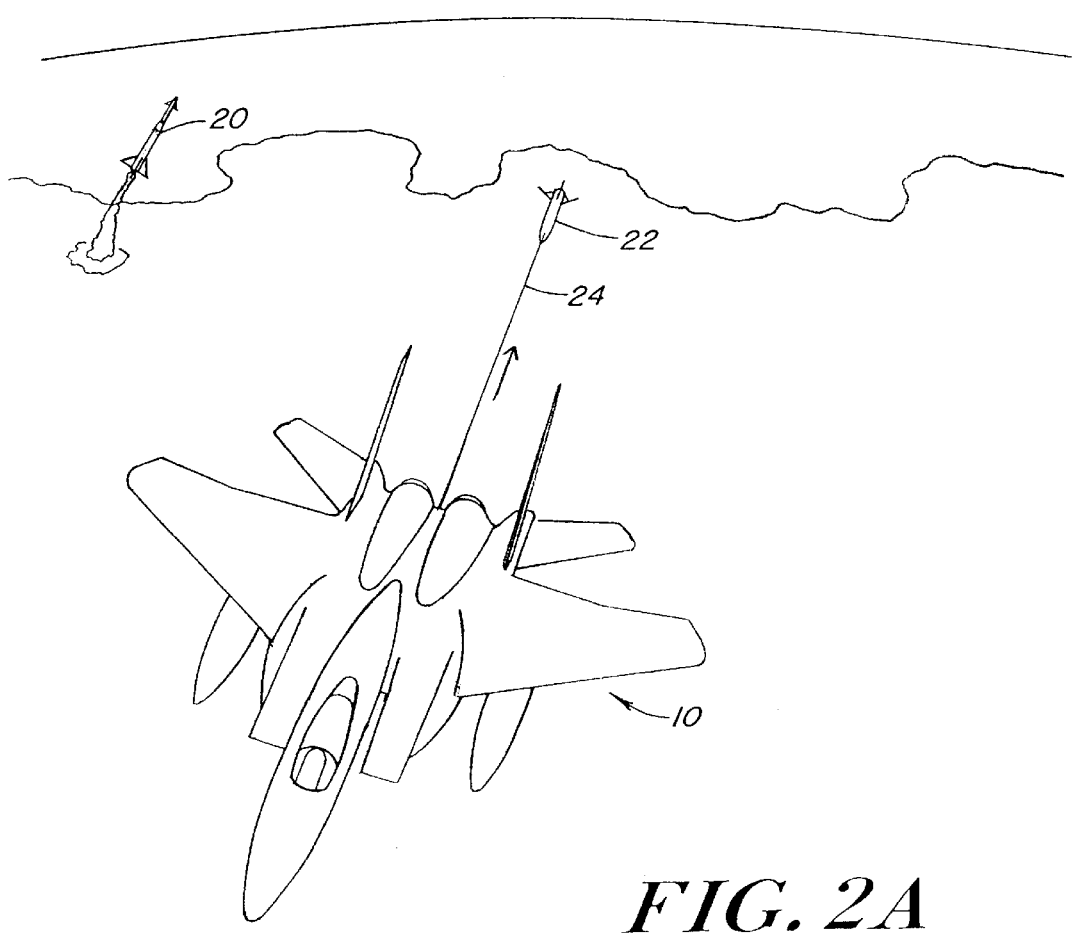
FIG. 2a is a diagrammatic illustration of the rapid deployment of a decoy from the illuminated aircraft, the purpose of which is to decoy the missile launched away from the aircraft.

Referring to FIG. 2a, upon illumination, an interceptor missile 20 is launched at aircraft; 10, with aircraft 10 upon sensing the launch of the missile either by direct sensing of the missile launch or by the fact of illumination causes a decoy 22 to be deployed behind aircraft 10 along a cable 24 to a distance which is operative to decoy the launched missile away from its intended target.

As will be described, the deployment of the decoy takes seconds as opposed to minutes and can be accomplished through a fast-deployment system involving a rotating spindle from which cable 24 is unreeled at a rapid but controlled rate. As mentioned before, there are single cable systems and multiple cable systems, depending upon the type of decoy round. Regardless of which of the systems is utilized, it is important to be able to deploy the decoy at a rapid rate in response to a sensed threat.

As mentioned hereinbefore, it was the typical practice to deploy a number of decoys upon entering into hostile territory and then cut them loose once leaving hostile territory. This presented a problem of having to run a mission with decoys in tow as well as the problem of having to sacrifice all of the decoys at the end of the mission, an expensive and time-consuming redeployment process.

Figure 2B:
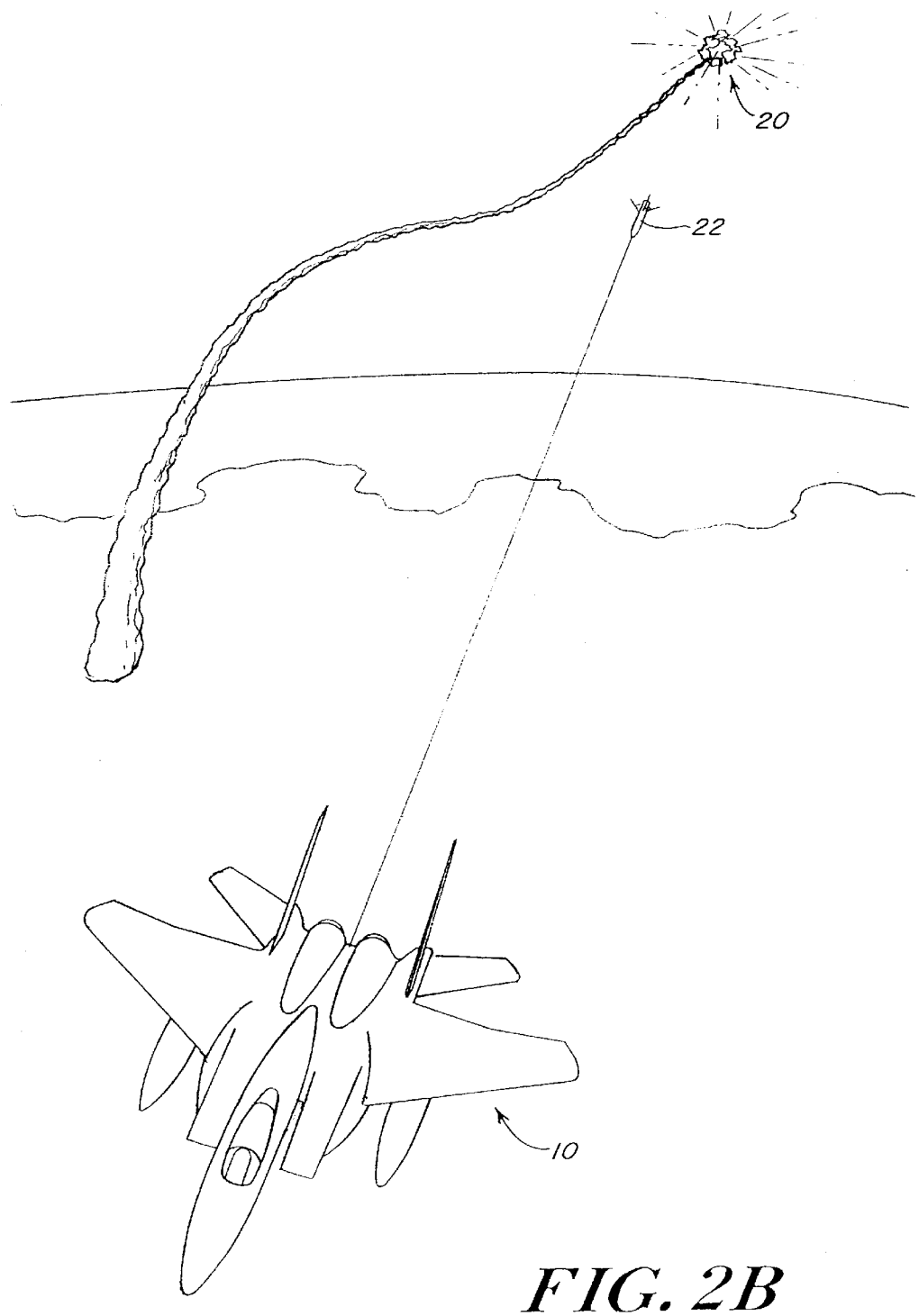
FIG. 2b is a diagrammatic illustration of the successful diversion of the interceptor missile from the illuminated aircraft, thus sparing the aircraft.

As can be seen from FIG. 2b interceptor missile 20 explodes away from aircraft 10 due to the action of decoy 22.

Figure 2C:
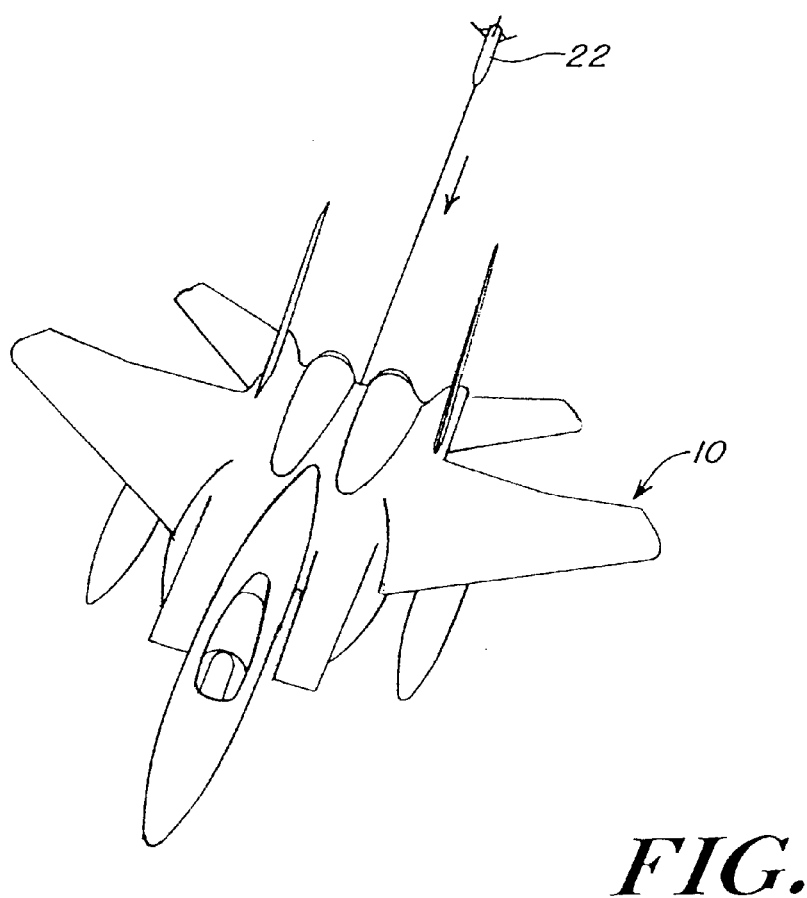
FIG. 2c is a diagrammatic illustration of the retrieval of the decoy after the threat has been sensed, the decoy deployed and the threat eliminated.

Referring to FIG. 2c, after the threat no longer exists, decoy 22 is reeled in or retrieved by aircraft 10 in such a manner that it may be redeployed and thus reused.

One of the more difficult and more challenging operational scenarios for dual cable systems requires the utilization of a relatively strong towing cable utilized along with a relatively fragile fiber-optic signal cable, with the towing cable being loaded during the deployment and retrieval of the decoy.

Figure 3:
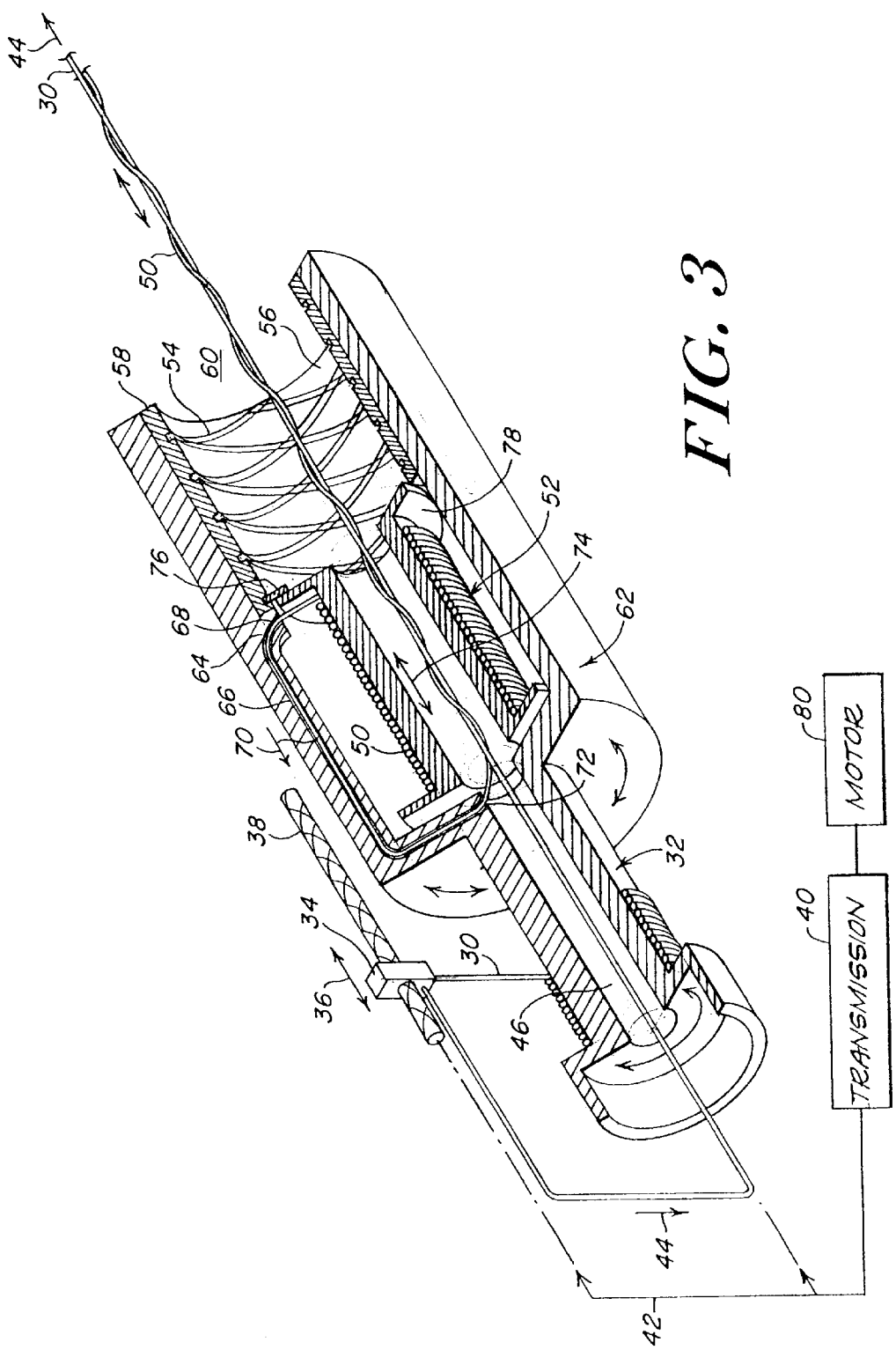
FIG. 3 is a sectional and diagrammatic illustration of one embodiment of the subject invention in which dual cables are utilized in the towing and control of a decoy showing the tow cable deployed around a central spindle and a fiber-optic signal cable deployed about a translatable rotationally-fixed bobbin, with the speed of deployment or retrieval of the cables controlled through the rotation of the spindle which causes the tow cable and the fiber-optic signal cables to be picked off and rewound at matched speeds.

Referring now to FIG. 3, such a dual cable system is shown in which a towing cable 30 is initially wrapped around a spindle 32 which is rotatably mounted in a housing (not shown in this figure). A translating pick or bale 34 translates in the direction of double-ended arrow 36 driven by a double helix drive 38 which is mechanically coupled to a transmission 40. The double helix drive 38 revolves at a speed determined by the rotation of spindle 32 as illustrated by mechanical linkage 42 such that cable 30 is either wound or unwound along spindle 32 in a level winding unwinding manner through the utilization of the double helix driven bale. a double helix drive 38 which is mechanically coupled to a transmission 40. The double helix drive 38 revolves at a speed determined by the rotation of spindle 32 as illustrated by mechanical linkage 42 such that cable 30 is either wound or unwound along spindle 32 in a level winding unwinding manner through the utilization of the double helix driven bale.

During the deployment of the decoy, spindle 32 rotates as cable 30 is pulled out due to the drag of the decoy once it has been deployed. In one embodiment the deployment is either via mechanical springs or via pyrotechnic launching apparatus.

When there is tension on cable 30, spindle 32 begins to rotate such that cable 30 moves in the direction of arrow 44 out through the center 46 of spindle 32 and out through the remainder of the spindle driven deployment apparatus such that the cable moves out of the canister housing the spindle and the decoy, again in the direction of arrow 44.

The tow cable typically is utilized for towing the decoy and is designed to be able to withstand the relative high loads associated during the towing operation. The tow cable may also be utilized to house a number of high-voltage lines that are utilized to power the traveling wave tube in a decoy.

In order for the decoy to operate as a counter-measure, signals must be coupled to the decoy and the traveling wave tube and these signals, in one embodiment, are passed over a signal line 50 which, in one embodiment, is a fiber-optic cable.

As will be seen, fiber-optic cable 50 is initially housed on a rotationally-fixed translating bobbing 52 which is driven by rotating helical grooves 54 which are in a surface 56 of an insert 58 which is press fit into a hollowed out region or cavity 60 of spindle 32.

As will be seen, spindle 32 is expanded outwardly as illustrated at 62 so as to accommodate translating bobbin 52 in cavity 60, with the expanded portion 62 having a pick 64 comprising a Note that bobbin 52 is secured against rotation and translates as illustrated by double-ended arrow 74 due to the coaction of a cam follower 76 on bobbin flange 78 which coacts with the helical tracks 54 in insert 58.

It will be seen that cable 50 is drawn outwardly by virtually of its wrapping around cable 30, with the relative rotation of orifice 68 vis a vis bobbin 52 and bale 30 vis a vis spindle 32 being matched in terms of velocity such that, in essence, these two cable dispensing devices are ganged together so that for a close approximation the cables go out at identical speeds.

Adjustments between the sizes and diameters of the cables and the respective diameters of spindle 34 and bobbin 52 can be taken into account so that the two lines pay out and are returned at the same speed. Thus, during deployment there is very little stress on the fiber-optic cable.

Moreover, since the fiber-optic cable can be fixedly anchored at one end to the bobbin and thence to electrical drive circuitry, there is no necessity in this embodiment for a fiber-optic rotating joint.

In the retrieval mode, the spindle 32 reverses its direction and is driven by motor 80 via transmission 40 such that the cables are drawn in both by bale 34 and pick 64 to effectuate a level-winding retrieval process in which the cables are laid down on their respective spindle and bobbin in an even manner to avoid snags.

Figure 4:
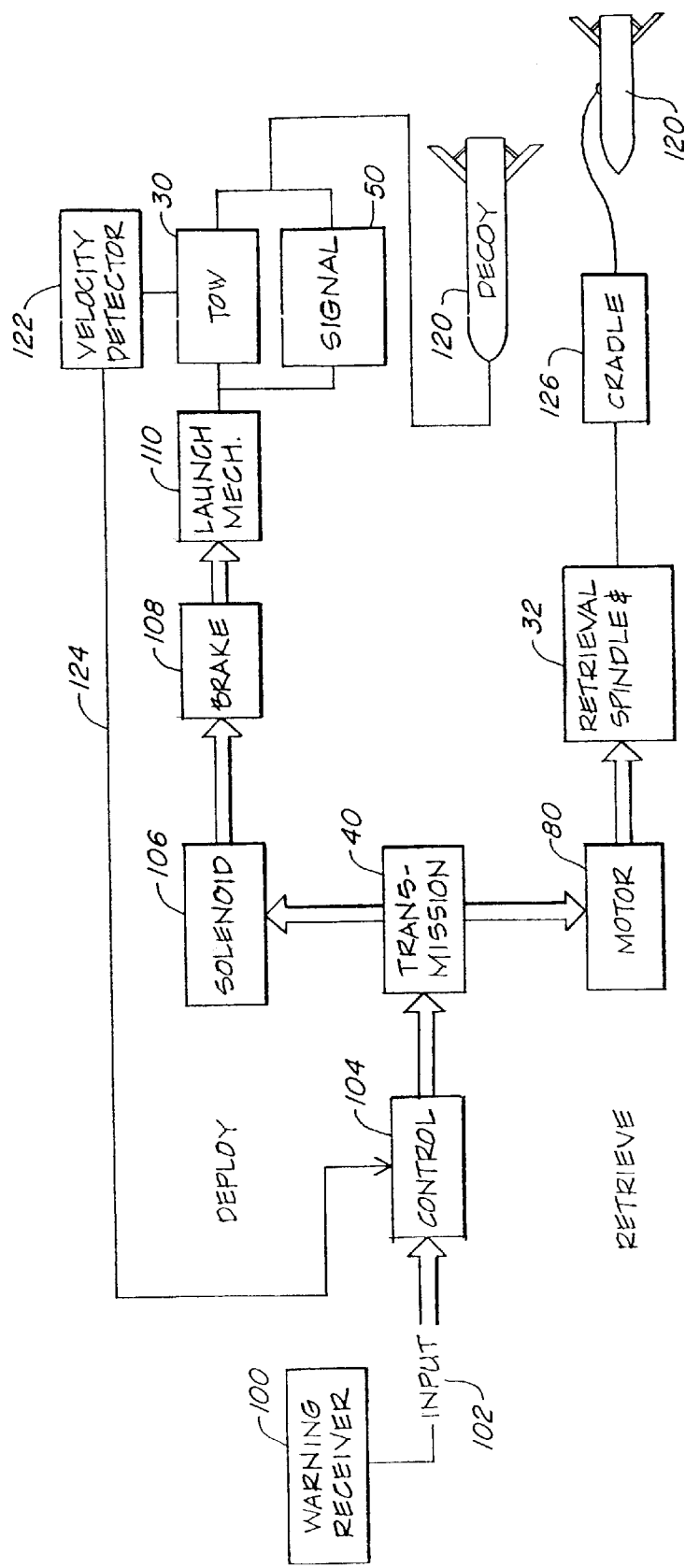
FIG. 4 is a block diagram of the subject system for the deployment of a decoy in response to the output of a warning receiver and the retrieval of the decoy after a threat has passed.

What will be appreciated is that for this particular embodiment, the two cables go out at the same speed and come back at the same speed and are level wound in such a manner to make the redeployment of the decoy possible. Referring to FIG. 4, in operation, a warning receiver 100 senses a threat and provides an input 102 to a control unit 104 which controls transmission 40 to either actuate a solenoid 106 to control a brake 108 for controlling after launch 110 the rate of deployment of tow cable 30 and signal cable 50 to a decoy 120.

The rate at which the decoy is deployed is controlled in one embodiment via a velocity detector 122 which is connected via line 124 to control 104 to control brake 108 through transmission 40 and solenoid 106, thus to control the speed of deployment.

During the retrieve cycle, control 104 is coupled to transmission 40 to couple motor 80 to the retrieve spindle 32 which draws the decoy 120 into a cradle 126 due to the aforementioned double helix driven baler and pick described in connection with FIG. 3.

Figure 5:
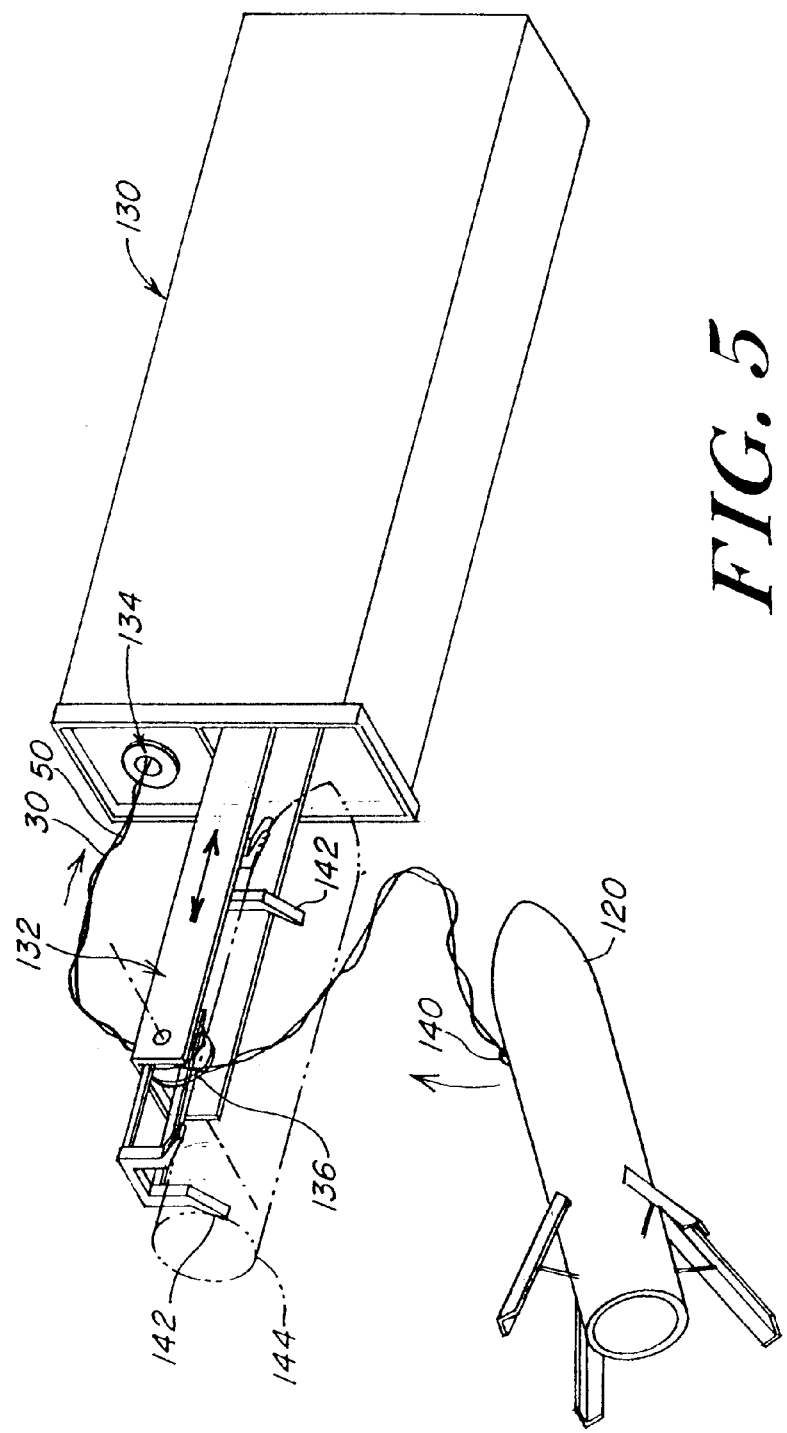
FIG. 5 is a diagrammatic illustration of the retrieval of a previously deployed decoy through a telescopically extended cradle from a canister that originally housed the decoy such that when the decoy is retrieved it is secured to the retractable cradle from whence the decoy may be redeployed in response to another sensed threat; and, FIG. 6 is a sectional and diagrammatic view of one embodiment of the subject invention illustrating the spindle/bobbin structure of FIG. 3, also indicating a braking solenoid and a transmission for switching between deployment and retrieval of the subject decoy.

Referring now to FIG. 5, the entire apparatus for deployment and retrieval of a decoy round is housed, in one embodiment, in a canister 130 which has an extensible or telescoping cradle unit 132 which is used in the retrieval of decoy 120 after the threat no longer exists.

Here, initially cables 30 and 50 exit canister 130 at an orifice generally indicated at 134 where they are deployed around a sheave 136 and are attached to decoy 120 at an attachment point 140.

During retrieval, motor 80 drives spindle 32 such that the tow cable and the signal cable are drawn into orifice 134, with sheave 136 resulting in the clamping of the surface of decoy 120 to arms 142 on telescoping cradle 132. The result of the retrieval of the decoy is such that the decoy sits in cradle 132 as illustrated by dotted lines 144, ready for redeployment.

Figure 6:
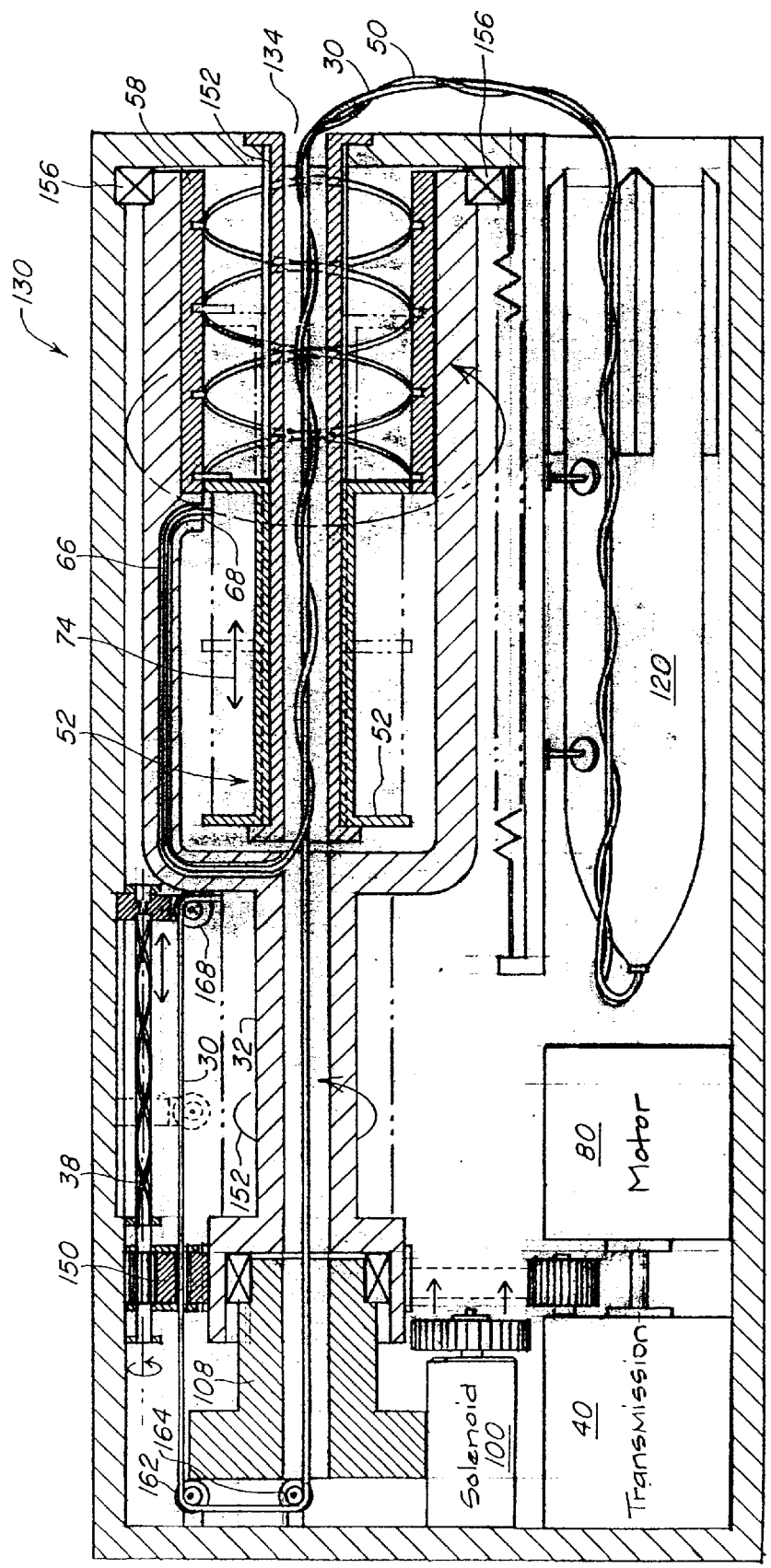

Referring now to FIG. 6, it can be seen that decoy 120 is housed within a compartment within canister 130 below orifice 134. Here it can be seen that in a single canister encloses motor 80, transmission 40, solenoid 106, brake 108 and the spindle 32/bobbin 52 structure shown in FIG. 3. Here it will be seen that a gearing mechanism 150 is utilized to control the speed of the double helix 38 in terms of the rotation 152 of spindle 32.

One type of solenoid driven braking system is described in U.S. Pat. No. 5,014,997 issued to John A. Smith and Mark A. Carlson and assigned to the assignee hereof.

What will be noted is that spindle 52 is mounted on a cylindrical inner member 152 which is fixedly coupled to canister 130. It is to this cylindrical member that bobbin 52 is translationally mounted but rotationally fixed such that the bobbin only translates but does not rotate.

As can be seen, spindle 32 is mounted at its distal end to bearings 156 and thus to canister 130, whereas for bale 34 there are a number of pulleys 160, 162 and 164 which guide the tow cable 30 from spindle 32 around and through the center of the spindle, as illustrated.

What has been described is a system for rapid deployment and retrieval of a towed decoy so that, regardless of the complex nature of the decoy and its drive circuitry and apparatus, the decoy can be safely and rapidly deployed in a matter of seconds and recovered so that it may be used again after the threat has ceased.

Having now described a few embodiments of the invention, and some modifications and variations thereto, it should be apparent to those skilled in the art that the foregoing is merely illustrative and not limiting, having been presented by the way of example only. Numerous modifications and other embodiments are within the scope of one of ordinary skill in the art and are contemplated as falling within the scope of the invention as limited only by the appended claims and equivalents thereto.

What is claimed is:

1. A method for protecting an aircraft against enemy missiles, comprising steps of:
   sense the approach of an enemy missile as a threat to the aircraft;
   deploying a towed decoy from the aircraft with a fiber optic cable providing signals to the decoy, the decoy being deployed upon sensing the threat such that the decoy is deployed within seconds to counter the threat; and,
   retrieving the decoy once the threat ceases, whereby the decoy can be stowed until the threat is sensed, the deployed, and retrieved after the threat is extinguished, thus to eliminate towing the decoy for the entire time that the aircraft is in hostile territory.

2. The method of claim 1, wherein the decoy is stowed in a canister on the aircraft and is deployed therefrom, and wherein the retrieved decoy is stowed in the canister upon retrieval.

3. The method of claim 1, wherein the step of deploying the decoy is fast such that the decoy is deployed in a matter of seconds.

4. The method of claim 3, wherein retrieval time for the decoy is greater than deployment time, making the method a fast deploy/slow retrieve method.

5. Apparatus for the protection of an aircraft entering hostile territory from a missile Attack, comprising:

a detector for detecting the approach of a missile;

a decoy having control electronics therein adapted to be towed behind said aircraft by a cable carrying a fiber optical signal wire cable;

a canister at said aircraft for housing said decoy and for storing said cable on a spool;

a cable unwinder for paying out said cable from said spool responsive to the detected approach of said missile such that said decoy is deployed in seconds; and a cable winder for retrieving said decoy by drawing said decoy into said canister after the threat posed by said missile has passed.

6. The apparatus of claim 5, wherein said cable includes, a towing cable and a signal cable.

7. The apparatus of claim 6, wherein said cable includes said fiber optic signal wire cable.

8. The apparatus of claim 6, wherein said spool rotates and carries said towing cable, and further including a bobbin which carries said fiber optic signal wire cable, said bobbin being rotationally fixed and translating back and forth in response to the rotation of said spool.

9. The apparatus of claim 8, wherein the cables on said spool and said bobbin are removed therefrom during decoy deployment at substantially the same rate.

10. The apparatus of claim 9, wherein said signal cable wraps around said towing cable during decoy deployment.

11. The apparatus of claim 6, wherein said cable unwinder for said spool includes a rotationally fixed bale adjacent to said spool for winding and unwinding said towing cable on and off said spindle.

12. The apparatus of claims 11, and further including a double helix track for translating said bale relative to said spindle for level winding during decoy retrieval.

13. The apparatus of claim 6, and further including a translationally fixed pick adjacent to said bobbin, said pick rotating with said spool for unwrapping and wrapping said signal cable in timed synchrony with the unwrapping and wrapping of said towing cable from and on to said spool.

14. The apparatus of claim 13, and further including a bobbin translator for moving said bobbin in timed relation to the rotation of said spindle.

15. The apparatus of claim 14, wherein said spindle has a hollow extension, wherein said translator includes double helix grooves in the interior surface of said hollow extension, and wherein said bobbin includes a projection adapted to move in said double helix grooves to translate said bobbin with the rotation of said spindle.

16. The apparatus of claim 5, wherein said spool rotates when said decoy is deployed and further including a brake for controlling the speed of rotation of said spool during decoy development and thus the speed of deployment.

17. The apparatus of claim 16, and further including a decoy retrieval motor and a transmission to selectively couple said motor to said spool during decoy retrieval.

18. The apparatus of claim 17, wherein said transmission deactivates said brake during retrieval of said decoy.

* * * * *